(12) United States Patent
Soulier et al.

(10) Patent No.: US 8,840,060 B2
(45) Date of Patent: Sep. 23, 2014

(54) ACTUATING DEVICE FOR A LOCKING SYSTEM OF AN ENGINE NACELLE

(75) Inventors: Pascal-Marie Paul Marcel Soulier, Le Havre (FR); Aurélie De Sorbay, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 1182 days.

(21) Appl. No.: 12/674,184

(22) PCT Filed: Jun. 12, 2008

(86) PCT No.: PCT/FR2008/000811
§ 371 (c)(1),
(2), (4) Date: Feb. 19, 2010

(87) PCT Pub. No.: WO2009/027589
PCT Pub. Date: Mar. 5, 2009

(65) Prior Publication Data
US 2011/0120143 A1 May 26, 2011

(30) Foreign Application Priority Data
Aug. 20, 2007 (FR) ...................................... 07 05917

(51) Int. Cl.
*B64D 29/06* (2006.01)
(52) U.S. Cl.
CPC ...................................... *B64D 29/06* (2013.01)
USPC ............................ 244/54; 244/129.4; 292/57
(58) Field of Classification Search
USPC ....... 244/53 R, 54, 55, 129.4; 292/57–61, 63, 292/64
See application file for complete search history.

(56) References Cited

U.S. PATENT DOCUMENTS

| | | | | |
|---|---|---|---|---|
| 901,511 A * | 10/1908 | Winn | ............................... | 292/71 |
| 1,920,976 A * | 8/1933 | Eber | ................................ | 292/57 |
| 2,758,861 A * | 8/1956 | Molloy | ........................... | 292/57 |
| 3,397,000 A * | 8/1968 | Yoshitaka | ....................... | 292/61 |
| 4,629,146 A * | 12/1986 | Lymons | ....................... | 244/53 R |
| 4,744,392 A * | 5/1988 | Tade et al. | ....................... | 138/89 |
| 5,046,689 A * | 9/1991 | Shine | ......................... | 244/129.4 |
| 5,253,904 A * | 10/1993 | Ruby | .............................. | 292/58 |
| 5,280,973 A * | 1/1994 | Culling | ........................... | 292/58 |
| 5,352,001 A * | 10/1994 | Shieh | ............................. | 292/57 |
| 5,704,569 A * | 1/1998 | Daniels | ..................... | 244/129.5 |

(Continued)

FOREIGN PATENT DOCUMENTS

| | | |
|---|---|---|
| EP | 1245769 | 10/2002 |
| FR | 609573 | 8/1926 |

OTHER PUBLICATIONS

International Search Report; PCT/FR2008/000811; Jan. 8, 2009.

*Primary Examiner* — Joseph W Sanderson
(74) *Attorney, Agent, or Firm* — Brinks Gilson & Lione

(57) ABSTRACT

An actuating device is provided for a locking system which locks one of half-shells of a jet engine nacelle with respect to the other half-shell. The actuating device includes a fixed body in which an actuating rod is translationally and rotationally mounted with respect to the rod's longitudinal axis, and the fixed body has a track cooperating with a follower projecting from the actuating rod. In particular, the actuating rod includes a first end equipped with a handle and a second end connected to the locking system. The track has a middle part running parallel to the longitudinal axis, a first end part and a second end part formed on each side of the middle part, each of the end parts running perpendicular to the longitudinal axis.

9 Claims, 6 Drawing Sheets

(56) References Cited

U.S. PATENT DOCUMENTS

| | | | |
|---|---|---|---|
| 5,737,914 A * | 4/1998 | Porte et al. | 60/226.1 |
| 6,227,485 B1 * | 5/2001 | Porte | 244/54 |
| 6,325,428 B1 | 12/2001 | Do | |
| 6,622,963 B1 * | 9/2003 | Ahrendt et al. | 244/54 |
| 6,629,712 B2 * | 10/2003 | Jackson et al. | 292/263 |
| 7,021,678 B1 * | 4/2006 | Raoult | 292/63 |
| 7,195,291 B2 * | 3/2007 | Kobayashi et al. | 292/57 |
| 2002/0140238 A1 * | 10/2002 | Jackson et al. | 292/263 |
| 2002/0145289 A1 * | 10/2002 | Cole et al. | 292/58 |
| 2003/0102405 A1 * | 6/2003 | McEvoy | 244/54 |
| 2003/0192987 A1 * | 10/2003 | Ahrendt et al. | 244/54 |
| 2007/0267539 A1 * | 11/2007 | Bulin | 244/53 R |

* cited by examiner

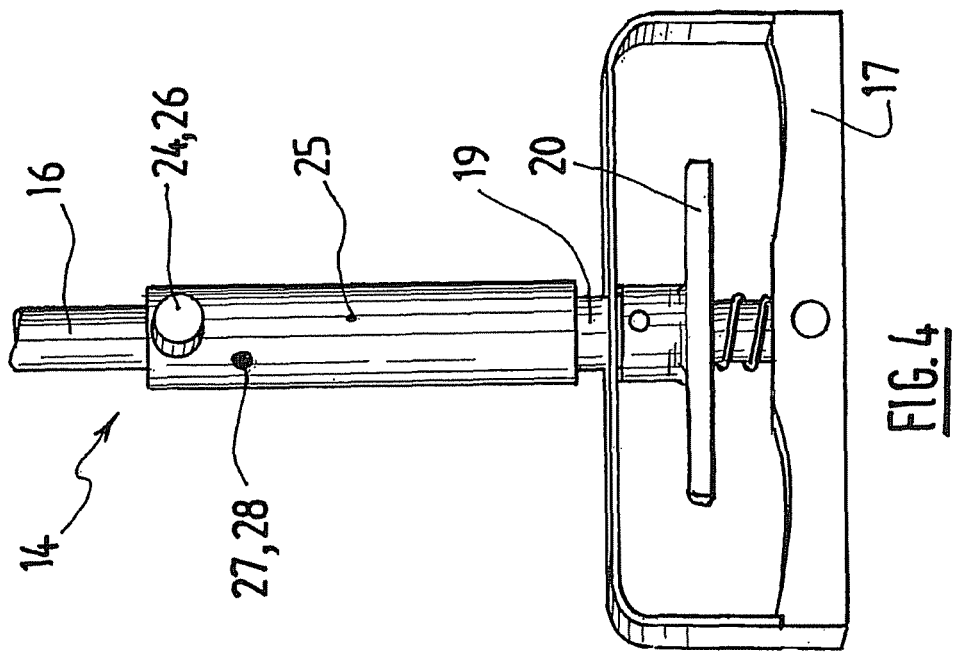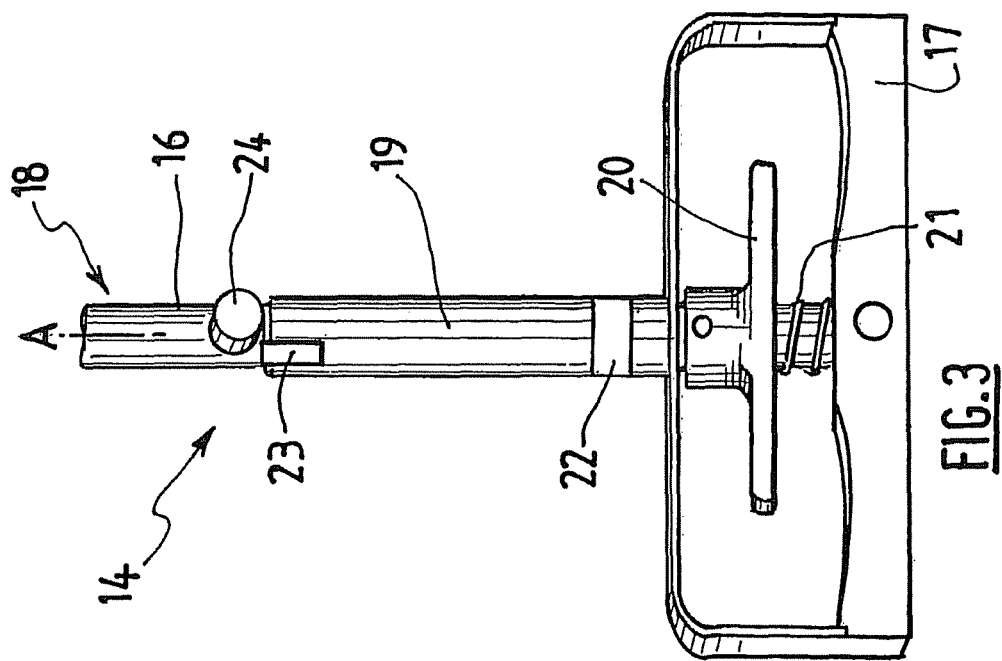

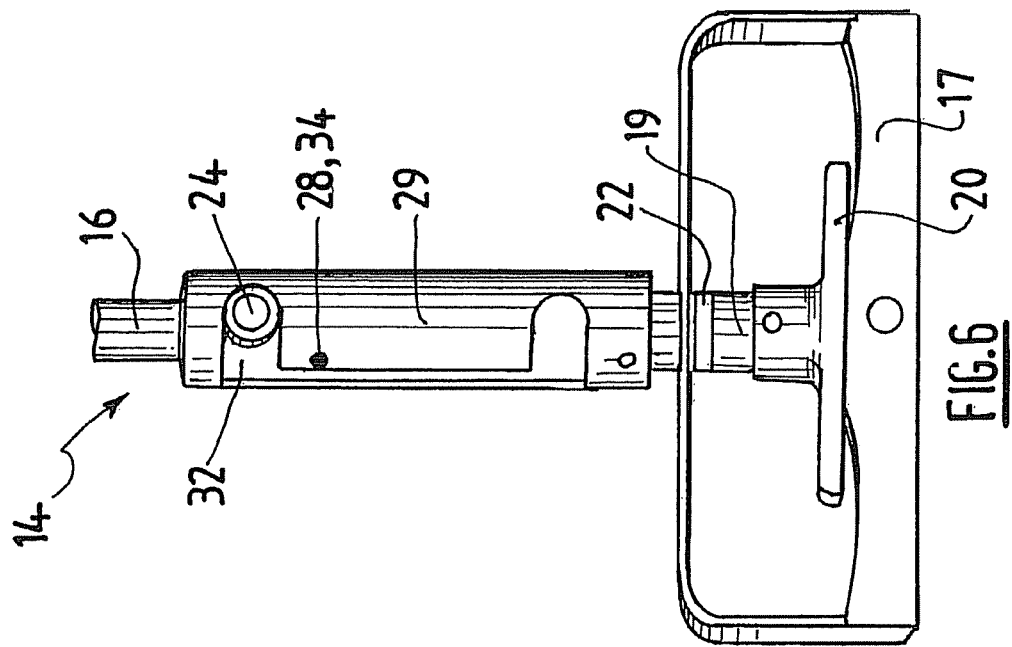
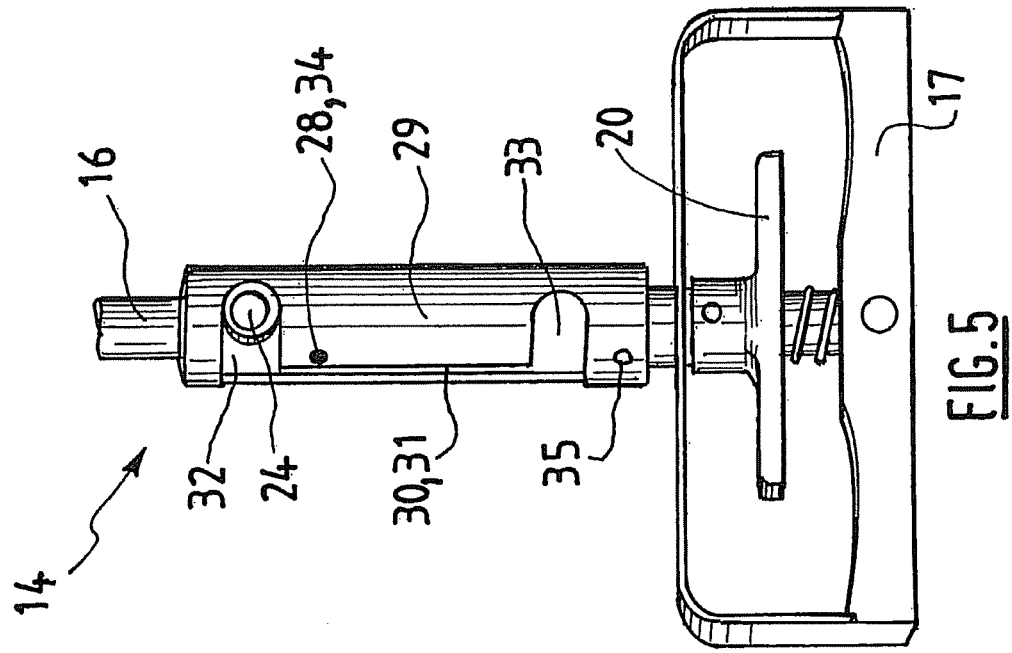

ACTUATING DEVICE FOR A LOCKING SYSTEM OF AN ENGINE NACELLE

TECHNICAL FIELD

The disclosure relates to a nacelle for a turbojet engine intended to equip an aircraft.

BACKGROUND

An aircraft is propelled by a number of turbojet engines each housed in a nacelle that also houses a collection of ancillary actuating devices associated with the operation thereof and performing various functions when the turbojet engine is operating or stationary. These ancillary actuating devices notably comprise a mechanical system for the actuation of thrust reversers.

A nacelle generally has a tubular structure comprising an air intake forward of the turbojet engine, a middle section intended to surround a fan of the turbojet engine, a rear section that may house thrust reversal means and intended to surround the combustion chamber of the turbojet engine, and generally ends in a jet pipe, the outlet of which is situated downstream of the turbojet engine.

Modern nacelles are often intended to house a bypass turbojet engine capable, via the blades of the rotating fan, of generating a flow of hot air (also known as the primary flow) from the turbojet engine combustion chamber.

A nacelle generally has an outer structure, known as the Outer Fixed Structure (OFS), which, together with a concentric inner structure, known as the Inner Fixed Structure (IFS), defines an annular duct for flow, also known as a flow path, intended to channel a flow of cold air, known as the secondary flow, which passes around the outside of the turbojet engine. The primary and secondary flows are ejected from the turbojet engine via the rear of the nacelle.

Each airplane propulsion unit is thus formed of a nacelle and of a turbojet engine, and is suspended from a fixed structure of the airplane, for example under a wing or on the fuselage, via a pylon or a strut attached to the turbojet engine or to the nacelle.

The rear section of the outer structure of the nacelle is usually formed of a first and of a second half-shell of substantially semicylindrical shape, one on each side of a longitudinal vertical plane of symmetry of the nacelle, and movably mounted such that they can be deployed between a working position and a maintenance position with a view to providing access to the turbojet engine. The two half-shells are generally pivot-mounted about a longitudinal axis that forms a hinge in the top part (in the 12 o'clock position) of the reverser. The half-shells are kept in the closed position by means of locking devices positioned at least along a meeting line situated in the bottom part (in the 6 o'clock position).

Conventionally, the nacelle is equipped with at least one locking system designed to lock one of the half-shells relative to the other, it being possible for the locking system to be actuated between a locked state and an unlocked state using an actuating device.

The actuating device is generally in the form of a handle connected to a first end of a control rod mounted such that it can be moved translationally relative to the corresponding half-shell, the second end of the rod being connected to the actuating system.

The translational movement of the handle by an operator unlocks or locks the locking system.

A nacelle such as this has the disadvantages listed hereinbelow.

In order to ensure that the locking system is correctly locked or correctly unlocked, the handle has to be moved over the full length of its travel.

There is therefore a risk that an operator will move the handle translationally over just part of the handle travel, with the result that the locking system will not be correctly actuated.

This may have repercussions during flight, when the locking system is not correctly locked. Furthermore, if the locking system is incompletely unlocked, there is a risk that the nacelle will become damaged during maintenance operations when the two half-shells are parted from one another.

Another known actuating device comprises a rod that can move only in terms of rotation. This type of actuating device generally entails a preloading on the part of the operator, in order to actuate the locking system. When such a device is applied to a locking system that does not require preloading, the operator may consider the nacelle to have a locking fault and that additional checks need to be performed as a result.

BRIEF SUMMARY

This disclosure addresses these disadvantages by proposing a nacelle that allows more reliable actuation of the locking system.

To this end, the disclosure relates to a turbojet engine nacelle of the aforementioned kind, wherein the actuating device comprises a fixed body in which an actuating rod is mounted such that it can be moved translationally and rotationally with respect to its longitudinal axis, the rod having a first end equipped with a handle and a second end connected to the locking system, the fixed body comprising a track collaborating with a follower element that projects from the rod, the track having a middle part running parallel to the axis of the rod, on each side of which there are respectively formed a first and a second end part running substantially perpendicular to the axis of the rod.

Thus, the locking system is actuated by performing the following succession of steps. First of all, the operator pivots the handle through a determined angle then pulls on the handle. Finally, he once again pivots the handle through a determined angle. The translational movement of the handle and therefore of the actuating rod actuates the locking system in the conventional way, the pivoting of the handle at the start and end of the rod travel ensuring that the rod has covered the full length of its travel. Furthermore, when a pivoting movement is performed at the start or at the end of the rod travel, that is to say when the follower element is collaborating with one of the end parts of the track which are positioned perpendicular to the axis of the rod, this rod is held in position.

Hence, for example, there is no risk that the rod will shift under the effect of gravity.

In an exemplary embodiment, the actuating device comprises means of immobilizing the rod, it being possible for these to be actuated alternately between a locked position in which the rod is prevented from moving and an unlocked position in which the rod can be rotated.

In this way, when the follower finger is correctly positioned in one of the end parts of the track, an operator has first of all to actuate the immobilizing means in order to be able to cause the handle to pivot and then to move in a translational manner. This further improves the safety of the nacelle.

Advantageously, the immobilizing means comprise a first sleeve slidably mounted on the rod between a locked position and an unlocked position, a second sleeve being mounted on the first sleeve and being fixed relative to the rod, the second sleeve comprising at least one opening in which at least one coupling element is mounted such that it can move, it being possible for the coupling element to be moved alternately between a position in which it couples the second sleeve and the body when the first sleeve is in the locked position, and a position in which it uncouples the second sleeve and the body when the first sleeve is in the unlocked position.

Thus, in order to unlock the rod by turning, the operator has first of all to move the first sleeve into the unlocked position so that the coupling element is no longer rotationally coupling the second sleeve and the fixed body. If it fails to do this, if the first sleeve is in the locked position, the second sleeve, which is fixed relative to the rod, rotates as one with the fixed body. Thus, the rod cannot be pivoted and, as a result, the locking system cannot be actuated.

In an exemplary embodiment, the coupling element is held in the opening of the second sleeve and is designed to collaborate with at least one complementary housing formed in the body in such a way as to couple the second sleeve and the body in terms of rotation, the first sleeve comprising an indentation positioned facing the coupling element when the first sleeve is in the unlocked position, and distanced from the coupling element when the first sleeve is in the locked position, the coupling element being housed, at least partially, in the indentation when the first sleeve moves into the unlocked position so as to break free from the housing formed in the body, the coupling element being freed from the indentation as the first sleeve moves into the locked position so as to engage in the housing formed in the body.

Advantageously, the coupling element is a ball.

In an exemplary embodiment, the first sleeve comprises an additional handle at that one of its ends that faces toward the handle with which the rod is equipped.

In an exemplary embodiment, the actuating device comprises return means designed to move the first sleeve into the locked position.

This feature is further aimed at improving the safety of the nacelle.

Advantageously, the body comprises a first and a second housing that complement one another and are designed to collaborate with the ball when the rod is respectively in a first and in a second position, in which positions the follower element collaborates respectively with the first and second parts of the track which run substantially perpendicular to the axis of the rod.

In this way, the rod can be immobilized in terms of rotation at the start and end of its travel, that is to say when the locking device is completely locked or unlocked.

In an exemplary embodiment, the body comprises an outer part and an inner part which are fixedly joined together, the inner part being mounted on the second sleeve.

This feature makes the body easier to produce. Specifically, production of the body has to take account of the manufacturing tolerances which are commonplace in the field of aeronautical engineering.

Separating the body into two parts allows these requirements to be met while at the same time making the body simple to produce. Indeed, it then becomes possible to produce an outer part, which does not have a mechanical guiding function and does not have any function of holding the coupling element, with wide manufacturing tolerances, only the inner part intended to guide the rod being produced with tight tolerances and from a material which may differ.

In an exemplary embodiment, the first sleeve is equipped with an indicator ring designed to be visible to an operator when the first sleeve is in the unlocked position and designed not to be visible when the first sleeve is in the locked position.

The disclosure further relates to an aircraft equipped with a nacelle in an exemplary embodiment.

BRIEF DESCRIPTION OF THE DRAWINGS

In any event, the disclosure will be clearly understood from the following description, with reference to the attached schematic drawing which, by way of example, depicts one embodiment of this nacelle.

FIG. 3 is a front view of part of the actuating device;

FIG. 4 is a view corresponding to FIG. 3, in which the second sleeve is also depicted;

FIG. 5 is a view corresponding to FIG. 4, in which the inner part of the body is also depicted;

FIG. 6 is a view corresponding to FIG. 5, in which the first sleeve has been moved into the unlocked position;

DETAILED DESCRIPTION

Figure 1:
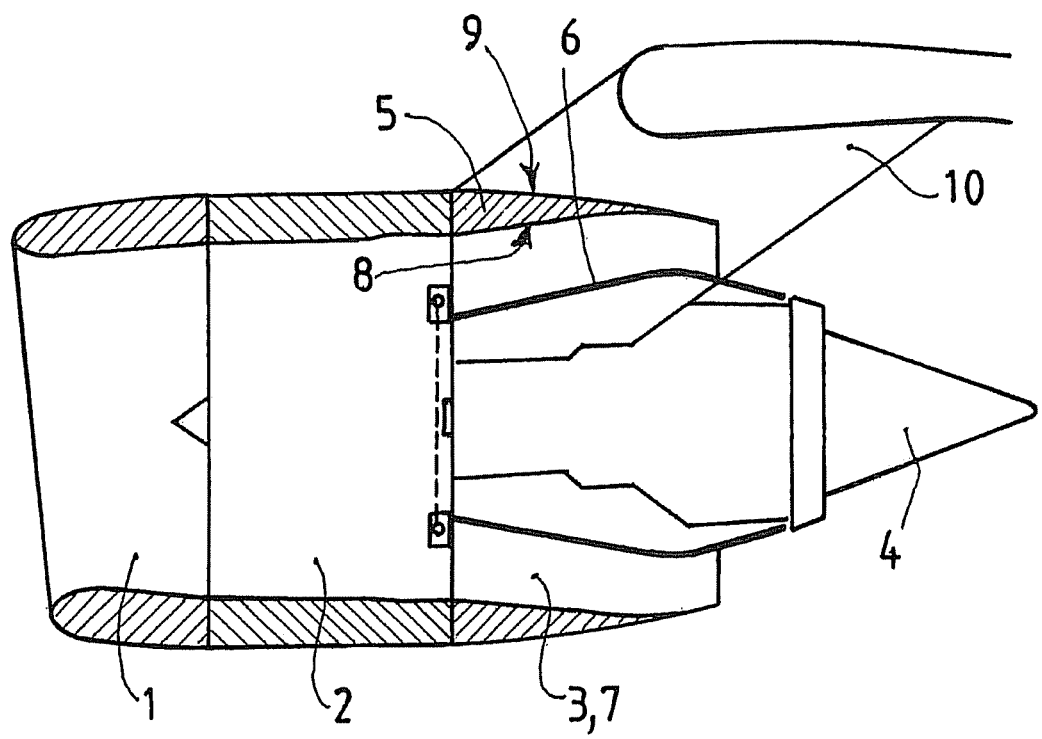
FIG. 1 is a schematic view of a nacelle in longitudinal section.

FIG. 1 depicts a nacelle in an exemplary embodiment, intended to equip an aircraft. This nacelle has a tubular structure comprising an air intake 1 forward of the turbojet engine, a middle section 2 intended to surround a fan of the turbojet engine, a rear section 3 that may house thrust reversal means and which is intended to surround the combustion chamber of the turbojet engine, and ends in a jet pipe 4, the outlet of which is situated downstream of the turbojet engine.

The nacelle is intended to house a bypass turbojet engine capable, via the blades of the rotating fan, of generating a flow of hot air (also known as the primary flow) from the turbojet engine combustion chamber.

The nacelle has an outer structure 5, known as the Outer Fixed Structure (OFS), which, together with a concentric inner structure 6, known as the Inner Fixed Structure (IFS), defines an annular duct 7 for flow, also known as a flow path, intended to channel a flow of cold air, known as the secondary flow, which passes around the outside of the turbojet engine. The primary and secondary flows are ejected from the turbojet engine via the rear of the nacelle.

Figure 2:
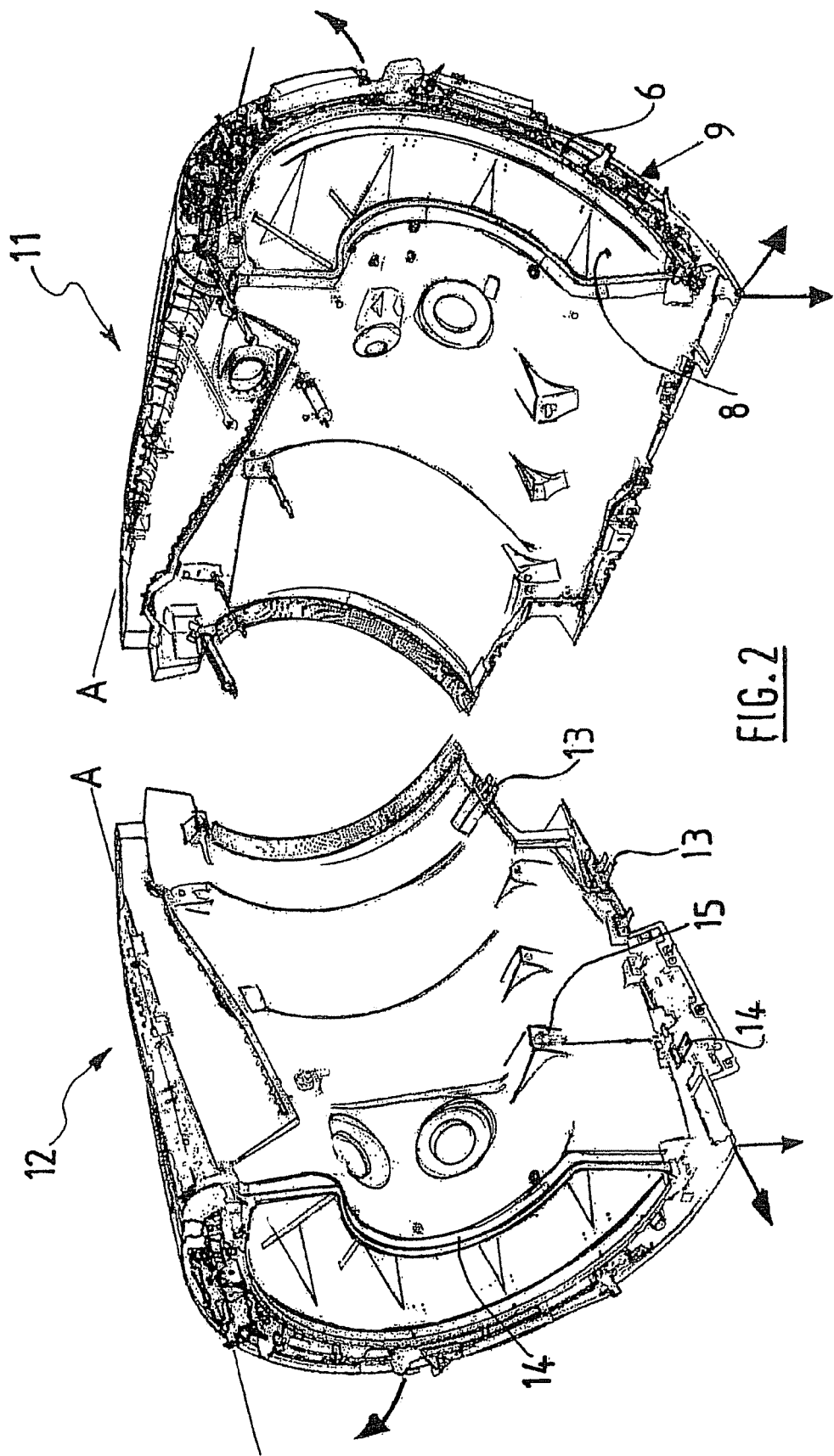
FIG. 2 is an exploded perspective view of the rear section of the nacelle.
Figure 8:
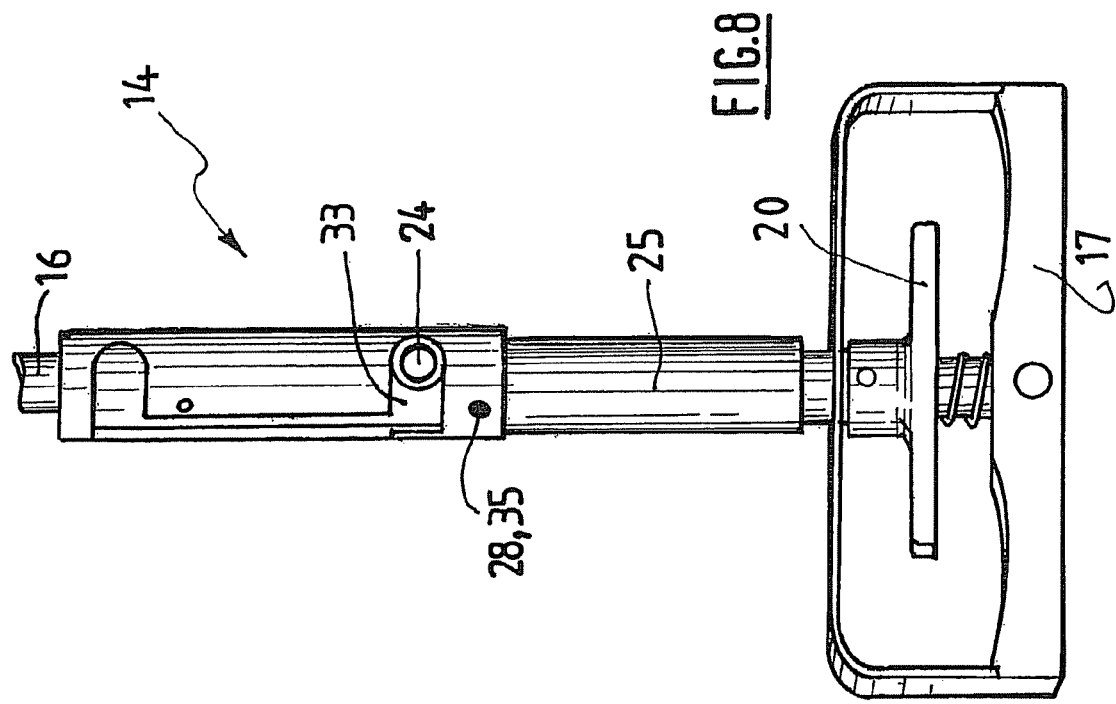
FIG. 8 is a view corresponding to FIG. 5, in which the rod has been moved.
Figure 7:
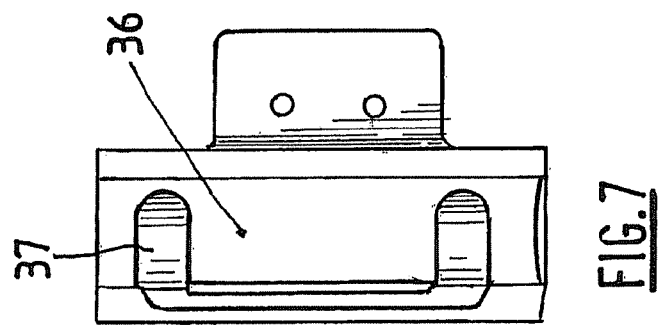
FIG. 7 is a front view of the outer part of the body.

As is more particularly apparent in FIG. 2, the outer structure 5 comprises an inner cowl 8 and an outer cowl 9.

Each aircraft propulsion unit is thus formed of a nacelle and of a turbojet engine, and is suspended from a fixed structure of the aircraft, for example under a wing or on the fuselage, via a pylon or a strut 10 attached to the turbojet engine or to the nacelle.

As may be seen in FIG. 2, the rear section 5 of the outer structure of the nacelle is formed of a first and of a second half-shell 11, 12 of substantially semicylindrical shape, one on each side of a longitudinal vertical plane of symmetry of the nacelle, and mounted such that they can move relative to the strut in such a way that they can be deployed between a working position and a maintenance position with a view to providing access to the turbojet engine. The two half-shells 11, 12 are each pivot-mounted about an axis A that forms a hinge in the top part (in the 12 o'clock position) of the reverser. The half-shells are kept in the closed position by means of locking devices 13 positioned along a meeting line situated in the bottom part (in the 6 o'clock position) and in the bottom part (in the 12 o'clock position). The locking devices are actuated using a locking device.

Disclosed is a particular type of locking device, the position of which is illustrated in FIG. 2 using the reference 14, the purpose of which is to actuate a locking system 15 located remotely with respect to the outer cowl of the nacelle, and of which the handle in the locked position does not protrude beyond the outer surface of the nacelle.

The structure of the locking device according to an exemplary embodiment will now be described with reference to FIGS. 3 to 8.

Part of the locking device 14 is depicted in FIG. 3.

This device comprises an actuating rod 16 that has a first end equipped with a handle 17 of rectangular overall shape, and a second end 18 connected to the locking system 15, as known per se by those skilled in the art.

A first sleeve 19 is slidably mounted on the rod 16 between a locked position depicted particularly in FIG. 3 and an unlocked position depicted in FIG. 6.

The first sleeve 19 has a first end equipped with an additional handle 20 in the overall shape of a T. The first end of the first sleeve 19 passes through the handle 17 at an opening therein, the additional handle 20 being positioned in the rectangle delimited by the handle 17.

The position of the additional handle 20 and its shape allow an operator ergonomically to take hold of both the handle 17 and the additional handle 20.

A helical return spring 21 is positioned around the rod 16 and rests firstly against the first end of the first sleeve 19 and secondly against the handle 17 so that it forces the first sleeve 19 to move into the locked position.

The first sleeve 19 also comprises, near the first end, a red indicator ring 22, the purpose of which is explained hereinbelow.

The second end of the first sleeve 19 comprises an indentation or a ramp 23 running longitudinally and inclined radially toward the axis A of the rod in the direction of the second end of the sleeve.

The rod 16 is equipped with a follower finger 24 projecting outward.

As has been depicted in FIG. 4, the actuating device 14 comprises a second sleeve 25 mounted on the first sleeve 19 and comprising an opening 26 through which the follower finger 24 passes in order fixedly to connect the second sleeve 25 to the rod 16.

The second sleeve 25 has a first end facing toward the handle 17 and set back therefrom. The second sleeve 25 is positioned in such a way that its first end covers the indicator ring 22 when the first sleeve 19 is in the locked position. The second sleeve 25 has a second end, set back from which there is an opening 27 that forms a housing for a ball 28. The ball 28 is mounted such that it can move in the opening 27 between a locked position and an unlocked position, as better detailed hereinbelow.

The opening 27 is positioned along the axis of the indentation 23 so that, when the first sleeve 19 is in the unlocked position, the ball 28 is positioned facing the indentation 23 so that it can become, at least partially, inserted therein and so that, when the first sleeve 19 is in the locked position, the ball 28 is distanced from the indentation 23 or presses against that part of the indentation 23 that is least indented with respect to the outer surface of the first sleeve 19, it being recalled that the indentation 23 is inclined toward the second end of the aforementioned sleeve 19.

The diameter of the ball 28 is adjusted so that, when the first sleeve 19 is moved into the locked position, the ball 28 is moved into the locked position in which it projects from the second sleeve 25. Further, when the first sleeve 19 is moved into the unlocked position, the ball 28 is also moved into the unlocked position in which it is housed in the opening 27 and/or in the indentation 23. In this position, the ball 28 therefore no longer projects from the second sleeve 28.

An inner part 29 of a fixed body is mounted on the second sleeve 25, the inner part 29 comprising a track having a middle part 31 formed by a longitudinal opening from the ends of which there run two openings 32, 33 which are positioned perpendicular to the middle part, thus forming first and second end parts 32, 33 of the track 30.

The track 30 thus has an overall C-shaped opening comprising three successive parts 31 to 33 inside which the follower finger 24 runs.

The inner part 29 of the body further comprises a first and a second housing 34, 35 which are designed to collaborate with the ball 28 in respective first and second positions of the rod 16, in which positions the follower element 24 collaborates respectively with the first and with the second end parts 32, 33 of the track 30.

The body further comprises a fixed outer part 36 mounted on the inner part 29 and having a track 37 similar to that of the inner part 29, positioned facing the latter track, the follower finger 24 also running in the track 37 of the outer part 36. The inner part 29 of the body is fixedly connected to the outer part 36 by a pin that has not been depicted.

The way in which the actuating device 14 works will now be described in greater detail with the aid of FIGS. 5 to 9.

Figure 9:
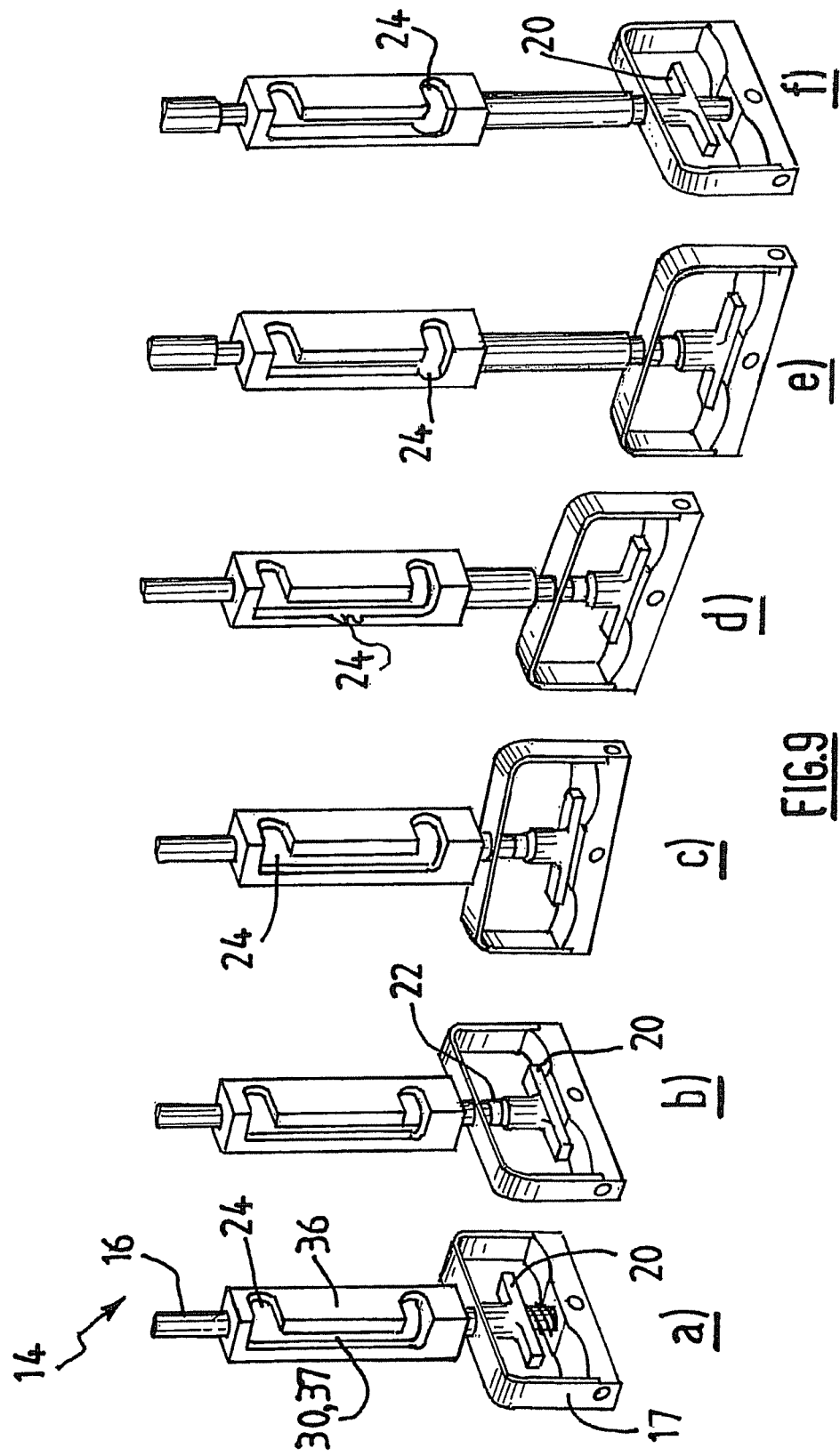
FIG. 9 depicts the successive steps in the kinematics of the actuating device.

More specifically, FIG. 9 depicts a number of successive positions of the actuating device 14.

In a position, depicted in FIG. 9a, in which the locking system 15 is locked, the rod 16 and the handle are positioned in a top position, the follower finger 24 being positioned at the end of the track 30 at the first end part 32 thereof.

In this position, the return spring 21 keeps the first sleeve 19 in the locked position, which means that the ball 28 is kept in the locked position in which it is inserted partially into the first housing 34 of the inner part 29 of the body. The ball 28 therefore allows the inner part 29 of the body to be coupled rotationally with the second sleeve 25, itself fixed to the rod 16. Because the inner part 29 is fixed, the rod 16 is so also and the operator cannot turn the handle 17. As we saw earlier, in this position, the indicator ring 22 is covered by the second sleeve 25 and is therefore not visible to the operator.

From this position, when the operator wishes to unlock the locking system 15, he first of all pulls on the additional handle 20 so as to move the first sleeve 19 into the unlocked position. In this position depicted in FIG. 9b, the ball 28 may be moved into the unlocked position in which it is freed from the first housing 34 of the inner part 29 of the body so that this inner part 29 is no longer rotationally coupled to the second sleeve 25. In this position, the indicator ring 22 of the first sleeve 25 is visible and the operator is able to turn the rod 16 so that the follower finger 24 moves across the first end part 32 of the tracks 30, 37 of the body, as can be seen in FIG. 9c.

The operator then pulls on the handle 17 so that the rod 16 and the follower finger 24 are moved downward, as depicted in FIG. 9d, until they reach the bottom end of the middle part 31 of the tracks 30, 37. In this position which has been depicted in FIG. 9e, the locking system 15 is therefore completely unlocked.

The operator then turns the handle 17 so that the follower element 24 moves across the second end part 33 of the tracks 30, 37 of the body until it reaches the corresponding end of the track 30.

In this position which has been depicted in FIG. 9f, the ball 28 is positioned facing the second housing 35 of the inner part 29 of the body. Thus, when the operator releases the additional handle 20, the return spring 21 forces the first sleeve 19 to move upward, that is to say into the locked position, so that the ball 28 is also moved into the locked position in which it is partially introduced into the second housing 35 of the inner part 29, so as to couple this inner part and the second sleeve 25 rotationally. In this position, the rod 16 is once again prevented from turning. Further, in this position, the ring 22 is no longer visible to the operator, thus indicating to him that the handle has indeed been moved fully in such a way as to actuate the locking system.

From this position, the locking system 15 is locked by performing the preceding steps in reverse sequence.

It goes without saying, the disclosure is not restricted merely to the one embodiment of this turbojet engine nacelle which has been described hereinabove by way of example, but on the contrary encompasses all variants.

The invention claimed is:

1. A nacelle for a turbojet engine to equip an aircraft, the nacelle comprising:
    a first and a second half-shell;
    at least one locking system to lock one of the first and second half-shells relative to the other of the first and second half-shells; and
    an actuating device for actuating the at least one locking system between a locked state and an unlocked state,
    wherein the actuating device comprises a fixed body in which an actuating rod is translationally and rotationally mounted with respect to a longitudinal axis of the rod, the rod having a first end equipped with a handle and a second end connected to the locking system, the fixed body comprising a track collaborating with a follower element that projects from the rod, the track having a middle part running parallel to the longitudinal axis of the rod, and a first and a second end part respectively formed on each side of the middle part and running substantially perpendicular to the longitudinal axis of the rod,
    wherein the actuating device comprises means of immobilizing the rod, the immobilizing means being actuated alternately between a locked position in which the rod is prevented from moving and an unlocked position in which the rod rotates,
    wherein the immobilizing means comprise a first sleeve slidably mounted on the rod between a locked position and an unlocked position, the first sleeve equipped with an indicator ring being visible to an operator when the first sleeve is in the unlocked position and invisible when the first sleeve is in the locked position.

2. The nacelle as claimed in claim 1, wherein the immobilizing means comprise a second sleeve being mounted on the first sleeve and being fixed relative to the rod, the second sleeve comprising at least one opening in which at least one coupling element is movably mounted, the at least one coupling element alternately moving between a coupling position in which the at least one coupling element couples the second sleeve and the fixed body when the first sleeve is in the locked position, and an uncoupling position in which the at least one coupling element uncouples the second sleeve and the fixed body when the first sleeve is in the unlocked position.

3. The nacelle as claimed in claim 2, wherein the at least one coupling element is held in the at least one opening of the second sleeve and collaborates with at least one complementary housing formed in the fixed body in such a way as to rotatably couple the second sleeve and the fixed body, the first sleeve comprising an indentation positioned facing the at least one coupling element when the first sleeve is in the unlocked position, and distanced from the at least one coupling element when the first sleeve is in the locked position, the at least one coupling element being housed, at least partially, in the indentation when the first sleeve moves into the unlocked position so as to disengage from the at least one complementary housing formed in the fixed body, the at least one coupling element being disengaged from the indentation as the first sleeve moves into the locked position so as to engage in the at least one complementary housing formed in the fixed body.

4. The nacelle as claimed in claim 3, wherein the at least one coupling element is a ball.

5. The nacelle as claimed in claim 2, wherein the first sleeve comprises an additional handle at an end of the first sleeve that faces toward the handle with which the rod is equipped.

6. The nacelle as claimed in claim 2, wherein the actuating device comprises return means designed to move the first sleeve into the locked position.

7. The nacelle as claimed in claim 1, wherein the fixed body comprises a first and a second complementary housing that collaborate with the ball when the rod is respectively in a first and in a second position, in which positions the follower element collaborates respectively with the first and second end parts of the track which run substantially perpendicular to the longitudinal axis of the rod.

8. The nacelle as claimed in claim 2, wherein the fixed body comprises an outer part and an inner part which are fixedly joined together, the inner part being mounted on the second sleeve.

9. An aircraft equipped with a nacelle as claimed in claim 1.

* * * * *